US005770315A

United States Patent [19]

Wiedemann

[11] Patent Number: 5,770,315

[45] Date of Patent: Jun. 23, 1998

[54] PROCESS FOR THE AFTERTREATMENT OF ALUMINUM MATERIALS, SUBSTRATES OF SUCH MATERIALS, AND THEIR USE FOR OFFSET PRINTING PLATES

[75] Inventor: Wolfgang Wiedemann, Geisenhem, Germany

[73] Assignee: Agfa-Gevaert AG, Leverkusen, Germany

[21] Appl. No.: 610,392

[22] Filed: Mar. 4, 1996

Related U.S. Application Data

[62] Division of Ser. No. 435,162, May 5, 1995, Pat. No. 5,556, 531.

[30] Foreign Application Priority Data

May 21, 1994 [DE] Germany .......................... 44 17 907.3

[51] Int. Cl.[6] ...................................................... B32B 15/00

[52] U.S. Cl. .......................... 428/446; 428/450; 428/469; 428/471; 428/472; 428/699; 428/701; 428/702

[58] Field of Search .................................... 428/446, 450, 428/469, 472, 471, 697, 699, 701, 702; 101/453, 456, 459

[56] References Cited

U.S. PATENT DOCUMENTS

| | | | |
|---|---|---|---|
| 2,882,152 | 4/1959 | Cohn | 96/75 |
| 3,902,976 | 9/1975 | Walls | 204/28 |
| 4,492,616 | 1/1985 | Pliefke | 204/33 |

FOREIGN PATENT DOCUMENTS

| | | |
|---|---|---|
| 0 154 201 | 9/1985 | European Pat. Off. . |

*Primary Examiner*—Timothy Speer
*Attorney, Agent, or Firm*—Foley & Lardner

[57] ABSTRACT

A process for the treatment of a material having an aluminum oxide layer comprising (a) treating the aluminum oxide layer with an aqueous solution of a pure and crystalline alkali metal silicate, and (b) rinsing the treated aluminum oxide layer with ion-containing water. A substrate so produced is useful in offset printing.

15 Claims, 6 Drawing Sheets

$\vartheta$-$Na_2Si_2O_5$

O Si
O O
O Na

PROCESS FOR THE AFTERTREATMENT OF ALUMINUM MATERIALS, SUBSTRATES OF SUCH MATERIALS, AND THEIR USE FOR OFFSET PRINTING PLATES

This application is a division of application Ser. No. 08/435,162, filed May 5, 1995, now U.S. Pat. No. 5,556,531.

BACKGROUND OF THE INVENTION

Substrate materials for offset printing plates are provided, either by the user directly or by the producer of precoated printing plates, on one or both sides, with a radiation-sensitive or light-sensitive layer, which is a so-called reproduction layer. With the aid of the sensitive layer an image of an original which is to be printed is produced by a photomechanical method. After exposure and development of the radiation-sensitive layer, the substrate bears the image parts which carry ink during subsequent printing. At the same time the substrate forms the hydrophilic image ground for the lithographic printing process, in the parts which are image-free during subsequent printing, the so-called nonimage parts.

The following requirements are therefore set for a substrate for reproduction layers for the production of offset printing plates:

(i) those parts of the radiation-sensitive layer which have become relatively more soluble after exposure must be capable of being removed readily and completely from the substrate by a development in order to produce the hydrophilic nonimage parts;

(ii) the substrate bared in the nonimage parts must have high affinity to water, i.e., must be strongly hydrophilic, in order to absorb water rapidly and permanently in the lithographic printing process and to have a sufficiently repellant action with respect to the greasy printing ink; and (iii) the adhesion of the radiation-sensitive layer before exposure or of the printing parts of the layer after exposure must be sufficient.

The base material used for such substrates typically is in particular aluminum, which is roughened on the surface by known methods, such as by dry brushing, wet brushing, sand blasting or chemical and/or electrochemical treatment. To increase the abrasion resistance, the roughened substrate is also usually subjected to an anodizing step to build up a thin oxide layer.

In practice, the substrate materials, in particular anodically oxidized substrate materials based on aluminum, are often subjected, before application of a radiation-sensitive layer, to a further treatment step as described, for example, in EP-B 0 105 170 and EP-B 0 154 201, both of which are incorporated by reference herein in their entireties, to improve the layer adhesion, to increase the hydrophilic character and/or to facilitate development of the radiation-sensitive layers.

EP-B 0 105 170 discloses a process for the after-treatment of aluminum oxide layers with an aqueous alkali metal silicate solution, in which, after the treatment (a) with an aqueous alkali metal silicate solution has been carried out, a treatment (b) with an aqueous solution containing alkaline earth metal salts is additionally carried out. The alkali metal silicate solution is an aqueous solution containing $Na_2SiO_3.5H_2O$. Rinsing is then effected with distilled water, it also being possible to omit this intermediate cleaning. A treatment in an aqueous solution of an alkaline earth metal nitrate, such as, for example, of a calcium, strontium or barium nitrate, is carried out subsequently or directly after the application of the silicate. The intermediate rinsings with distilled water have a certain effect on the alkali resistance. In particular, alkali resistance is generally better in the case of pores which have not been subjected to intermediate rinsing after the silicate application stage than in the case of pores subjected to intermediate rinsing.

EP-B 0 154 201 describes a process for the after-treatment of aluminum oxide layers in a solution which contains an alkali metal silicate and alkaline earth metal cations. Calcium salts or strontium salts, in particular nitrates or hydroxides, are used as alkaline earth metal salts. The aqueous solution in the after-treatment additionally contains at least one complexing agent for alkaline earth metal ions. The materials are electrochemically roughened in an aqueous solution containing nitric acid. The materials are furthermore anodically oxidized in one stage or in two stages in aqueous solutions containing $H_2SO_4$ and/or $H_3PO_4$. The aftertreatment is carried out electrochemically or by an immersion treatment.

In the case of the substrates which have been treated by the known processes, it is found that the sodium metasilicates frequently used for silicate application, such as, for example, $Na_2SiO_3.5H_2O$, degrade the aluminum oxide very rapidly in an undesirable manner at relatively high pH of the aftertreatment solution of 12.2.

SUMMARY OF THE INVENTION

It is therefore an object of the present invention to improve a process for the aftertreatment of aluminum substrates which have an aluminum oxide layer in such a way that the degradation of the oxide layer by a silicate application can be avoided or at least kept to a very slight level.

It is also an object of the invention to provide an aluminum substrate which avoids the problems of the prior art.

It is also an object of the invention to provide aluminum substrates useful for offset printing plates, which improve upon the prior art substrates.

In accordance with these and other objects readily apparent to those skilled in the art, there has been provided a process for the treatment of a material having an aluminum oxide layer comprising (a) treating the aluminum oxide layer with an aqueous solution of a pure and crystalline alkali metal silicate, and (b) rinsing the treated aluminum oxide layer with ion-containing water.

In accordance with these objects, there has also been provided a substrate comprising an aluminum oxide layer coated with an alkali metal silicate layer, wherein the alkali metal silicate layer comprises pure, crystalline, sheet sodium silicate.

There is also provided an offset printing plate comprising such a substrate.

Further objects, features, and advantages of the invention will become apparent from the detailed description which follows.

DETAILED DESCRIPTION OF THE PREFERRED EMBODIMENTS

Figure 1:
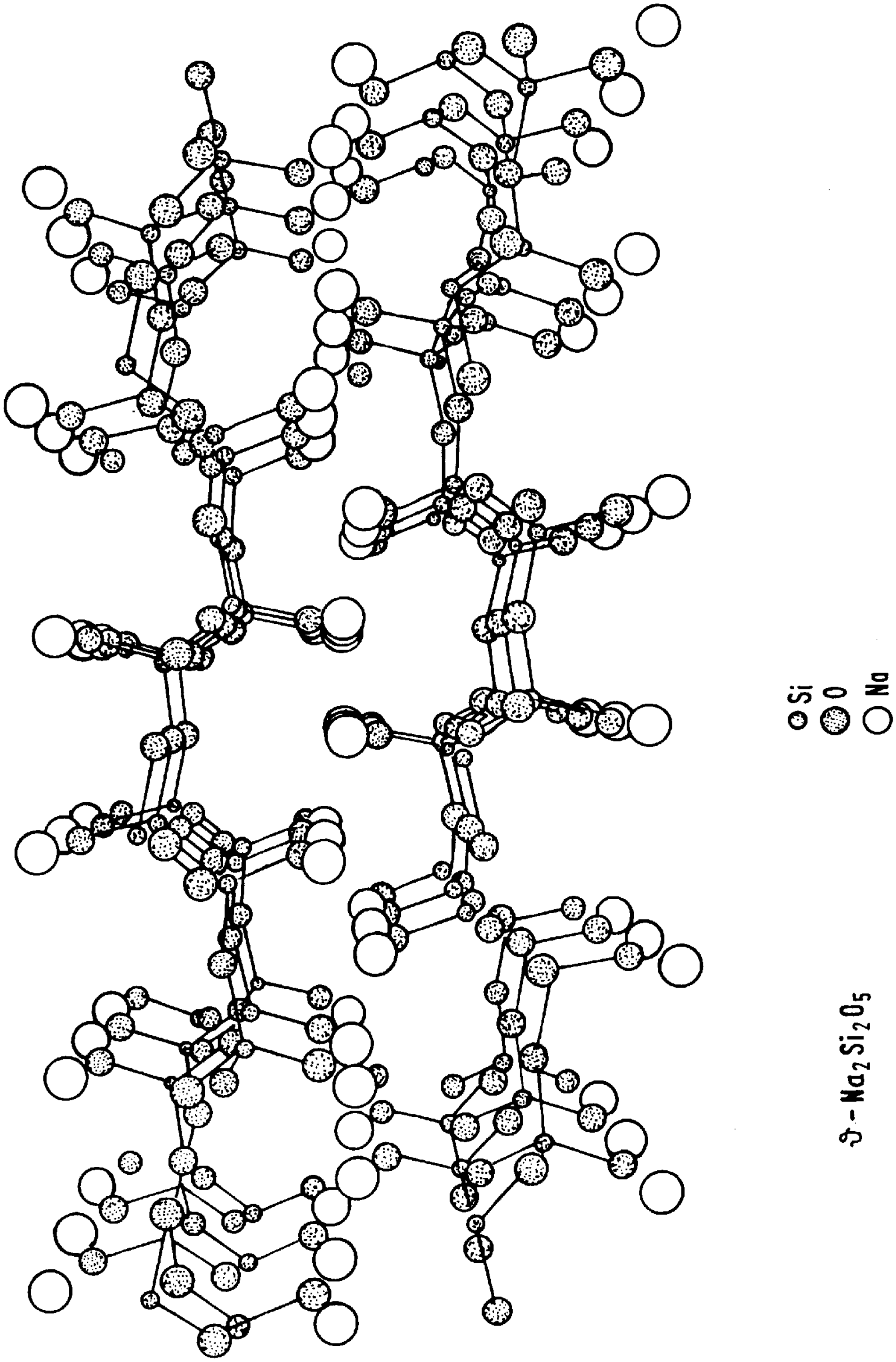
FIG. 1 shows the structure of the sheet sodium silicate which can be used for silicate application in the aftertreatment stage.

According to the invention, an aftertreatment (a) of an aluminum oxide layer is carried out in an aqueous solution of a pure and crystalline alkali metal silicate and rinsing (b) is then effected with ion-containing water. It has been found to be expedient if the ion-containing water contains alkali metal or alkaline earth metal ions which are selected from Ca, Mg, Na, K and/or Sr.

Any pure and crystalline alkali metal silicate can be used in stage (a). Any treatment method can be used so long as the silicate comes into contact with the aluminum oxide layer. In an embodiment of the process of the invention, in the aftertreatment stage (a), after-treatment is effected with an aqueous solution of the ϑ-modification of sheet sodium silicate $Na_2Si_2O_5$ having a polymeric structure. The $SiO_2/Na_2O$ molar ratio of the crystalline sheet sodium silicate is preferably in the range from 1.9:1 to 3.5:1. In a further embodiment of the invention, the solution in the aftertreatment stage (a) contains from 0.1 to 10% by weight of ϑ-$Na_2Si_2O_5$.

The aftertreatment stages (a) and (b) can be carried out in any desired manner, such as by an immersion treatment or electrochemically. The latter procedure results in an increase in the alkali resistance and/or an improvement in the adsorption behavior of the material. While not being bound by any theory, it is believed that by stage (a) a firmly adhering silicate top layer, which protects the aluminum oxide against attack, forms in the pores of the aluminum oxide layer, whereby the previously produced surface topography, such as roughness and oxide pores, are virtually unchanged or only insignificantly changed.

The aftertreatment stage (a), effected, for example, electrochemically and/or by an immersion treatment, is preferably carried out for a time of from 10 to 120 seconds and at a preferred temperature of from 40° C. to 80° C. The electrochemical aftertreatment is carried out in particular, with direct current or alternating current, trapezoidal current, square-wave current or delta current or superposed forms of these current types. The current density is in general from 0.1 to 10 $A/dm^2$ and/or the voltage is from 3 to 100 volts.

The ion containing water of stage (b) may be any such water, for example, municipal water or water, such as demineralized water, to which ions have been added.

The aftertreatment stage (b) with ion-containing water may be followed by an immersion treatment in, for example, a 0.1–10% by weight, salt solution, this salt solution containing, for example, salt or a combination of salts selected from NaF, $NaHCO_3$, $CaSO_4$, LCl and $MgSO_4$.

In addition to aluminum, other suitable base materials for the substrates include alloys of aluminum which, for example, contain more than 98.5% by weight of Al and small amounts of Si, Fe, Ti, Cu and/or Zn.

All process stages can be carried out batchwise with, for example, sheets or foils but are preferably carried out continuously, for example, with strips in strip plants.

Regarding the process parameters in the continuous procedure in the initial electrochemical roughening stage, the preliminary cleaning and the anodic oxidation of the substrate material, in particular of aluminum, any desired processes are useful. Reference is made to the statements in EP-B 0 154 201, column 5, lines 5 to 39, 47, up to column 6, line 36 inclusive, and in EP-B 0 105 170, page 4, lines 11 to 60. Both of these documents are hereby incorporated by reference herein in their entireties. The pretreatments described in the documents are applicable to the substrates described here, for which the same process parameters are used in the electrochemical roughening, the preliminary cleaning, and the anodic oxidation. The disclosure of these two European patents with regard to the process parameters in the continuous procedure also applies in its entirety to the substrate materials of the present invention.

The invention is illustrated in more detail below with reference to the figures.

FIG. 1 shows the structure of sheet sodium silicate which is a pure sodium silicate, i.e., it is composed exclusively of sodium, silicon and oxygen. The word "pure" means that the silicate consists only of one or more alkali metals, silicon, and oxygen, i.e., the silicate is anhydrous. Any such silicates or mixtures are useful in stage (a). FIG. 1 shows the ϑ-phase of the crystalline disilicate $Na_2Si_2O_5$. It resembles the widely used water glass but is anhydrous and crystalline.

The structure shown in FIG. 1 was determined by X-ray diffraction on single crystals. It shows the polymeric wavy sheet structure of the silicate framework comprising sodium ions, which are represented in the Figure by large light spheres, oxygen, which is represented by large black spheres, and silicon which is represented by small black spheres. The sodium ions are virtually in a plane. The crystalline sheet sodium silicate, which is a sheet silica, generally has a $SiO_2/Na_2O$ molar ratio of from 1.9:1 to 3.5:1. The structure of this compound is virtually identical to that of the mineral natrosilite, which is a β-modification of $Na_2Si_2O_5$.

The base material used in the preparation of sheet sodium silicate is very pure sand and sodium carbonate or sodium hydroxide solution, from which a waterglass solution is prepared. This solution is then dehydrated and is crystallized at high temperature to give the delta-modification of the disilicate. The product obtained can be milled and, if required, compacted to produce granules. In aqueous solution, water penetrates between two layers and increases the spacing. The sodium ions are then accessible to exchange with other ions. Thus, the ions, such as the calcium and magnesium ions of the rinsing water of stage (b), for example, mains or municipal water, are bound by the crystalline sheet silicate in an ion exchange process, i.e., the sodium ions of the sheet silicate are rapidly replaced, with the result that the silicate framework is stabilized. This exchange process takes place more rapidly than the dissolution of the sheet sodium silicate, with the effect that the particles are much smaller than in the case of precipitates of the amorphous silicate. The sheet sodium silicate gives the desired alkalinity and stabilizes the pH. Sheet sodium silicate is offered by Hoechst AG as a builder for detergents.

A number of different compounds of the very complex sheet sodium silicate system (types SKS 1–21) are known under the name sheet silicates (SKS systems from Hoechst AG, corresponding to Schichtkieselsaure [sheet silica]). The type SKS-6 according to the invention having proven to be the most important with regard to builder properties in detergents (binding power of Mg and Ca ions); in addition, it is advantageously water-soluble for the silicate application and processing.

Thus, trioctahedral sheet silicates, such as SKS 20 (mineralogical name "saponite") and SKS 21 ("hectorite") also possess water solubility and good cation exchange power of the intercalated Na ions.

Furthermore, the anhydrous sheet sodium silicate having a kanemite structure (SKS-9) and synthetic kanemite (SKS 10) have very good Ca binding power.

Any desired radiation-sensitive coatings are applied to the aftertreated substrates, and the offset printing plates thus obtained are converted into the desired printing plate in a known manner by imagewise exposure and development of the nonimage parts with a developer, preferably an aqueous developer solution. Surprisingly, offset printing plates whose substrate materials were aftertreated by the two-stage process of the invention are distinguished, (compared with those plates in which the same substrate material was aftertreated with aqueous solutions which contain hydrous silicates, such as waterglass or α- or β-$Na_2Si_2O_5$), by improved alkali resistance, a lesser tendency to form chemical fog, and high stability to gumming of the offset printing plate.

In the description and the following Examples, the stated percentages are all % by weight, unless stated otherwise. The examples are meant to illustrate the invention, but in no way limit the invention. In the Examples, the following method is used for determining the alkali resistance:

Measurement of alkali resistance

To measure the alkali resistance of an anodically oxidized aluminum surface, a defined area of 7.5 cm×7.5 cm is immersed at room temperature, in a 0.1N NaOH solution having an electrolyte concentration of 4 g of NaOH per liter of demineralized water and the alkali resistance is determined electrochemically. For this purpose, the variation of the potential of an $Al/Al^{3+}$ half-cell as a function of time is measured against a reference electrode by a currentless method. The potential curve provides information about the resistance which the aluminum oxide layer offers to the dissolution of said layer.

The time in seconds which is determined after passing from a minimum up to the occurrence of a maximum in the voltage-time diagram serves as a measure of the alkali resistance. A mean value is calculated in each case from the measured values of two samples.

For the substrate material which has not been aftertreated, the alkali resistance at an oxide weight of 3.21 g/m$^2$ is 112±10 seconds, this value being a mean value of 5 double measurements.

Figure 2:
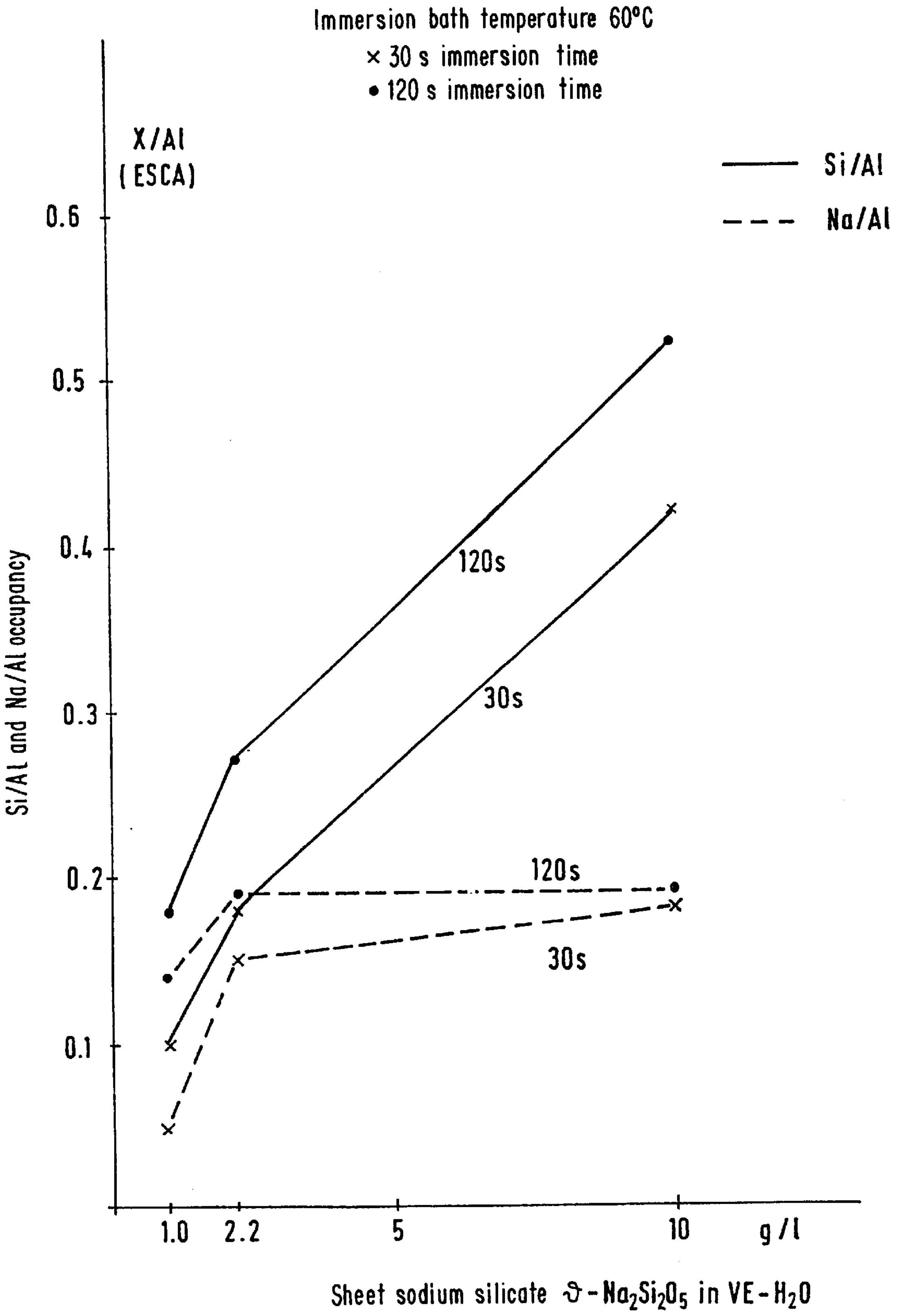
FIG. 2 shows the Si/Al ratio in the surface of a substrate as a function of the concentration of the sheet sodium silicate at a predetermined temperature of the immersion bath and a predetermined immersion time.

FIG. 2 shows the silicate application or the coating with silicate of an aluminum surface of a printing plate, in which the aftertreatment is carried out with sheet sodium silicate of different concentrations in aqueous solution at an immersion bath temperature of 60° C. for different times. The surface application of silicate is investigated by the ESCA method, "Electron Spectroscopy for Chemical Analyses", by means of which the atom layers at a surface up to a thickness of about 5 nm, on the basis of their binding energy position, and the surface atoms on the basis of the intensity of the maximum values, possibly their bonding state, can be determined. Furthermore, the intensity ratio of the various maximum values to the maximum value of aluminum permits an evaluation of the atomic occupancy on the aluminum oxide surface. FIG. 2 shows the Si/Al and the Na/Al ratio and the occupancy with Si and Na on the aluminum oxide surface.

The substrate having the highest Si/Al ratio is rinsed with demineralized water and dried and then gummed with an aqueous solution of dextrin, $H_3PO_4$ and glycerol, which has a pH of 5.0, and washed off after 16 hours with demineralized water. The Si/Al ratio does not change after this procedure and is 0.56, and the Na/Al ratio decreases to 0.07. The coating of the sheet sodium silicate is not attacked by the gumming, i.e., the silicate coat is not removed. In the ESCA spectrum, phosphorus from the gumming is merely indicated, which may be regarded as evidence of the fact that the gumming does not attack the silicate coat.

As is evident from FIG. 2, the silicate application on the aluminum oxide surface increases with increasing concentration of the sheet sodium silicate in the after-treatment solution, with increasing temperature of the immersion bath (cf. FIG. 5) and with increasing immersion time. This is expressed in particular in an increase in the Si/Al ratio. The concentration of the sheet sodium silicate was increased from 1 g/l to 10 g/l of demineralized water, the immersion temperature of the aftertreatment solution was increased from 60° to 80° C. (cf. FIG. 5) and the immersion time was increased from 10 s to 120 s.

Furthermore, it is found in the ESCA measurements that the applied sheet sodium, silicate retains its ion exchange capability, i.e., the sodium ions are exchanged for calcium ions on rinsing with mains water or municipal water. After silicate application and the rinsing with demineralized water, in addition to silicon a high sodium content is always detectable and is greatly reduced after rinsing with municipal or mains water, and an increase in the calcium content is found instead. While the magnesium content is poorly detectable after such rinsing, owing to the position of its maximum value, exchange of sodium for strontium was also found using a strontium solution (cf. also Table 2).

Figure 3:
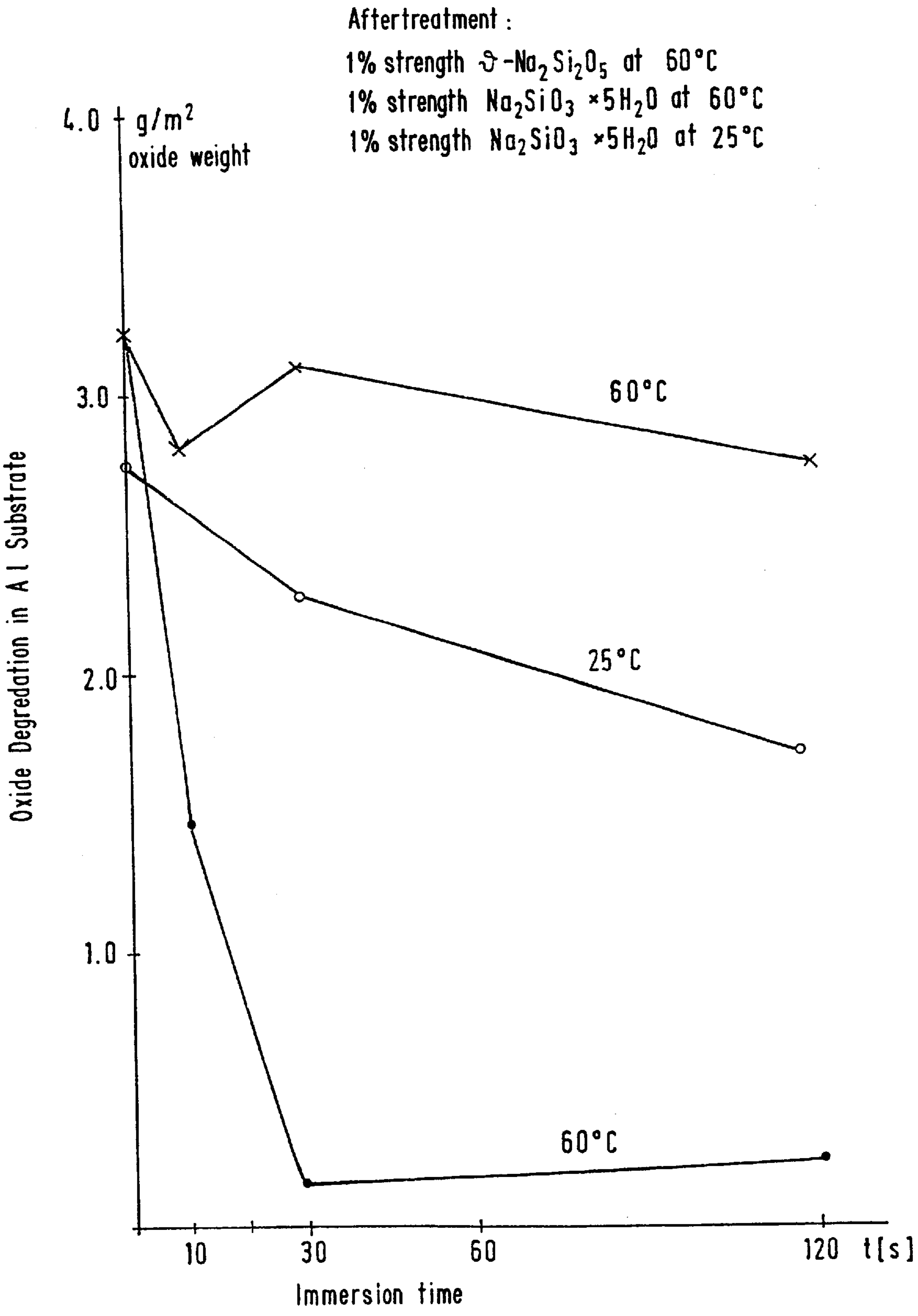
FIG. 3 shows the degradation of the oxide weight in the surface of a substrate as a function of the immersion time and of the temperature of the immersion bath.

FIG. 3 shows the oxide degradation in the aluminum oxide layer of a substrate or printing plate substrate. The substrate is electrochemically roughened in hydrochloric acid and anodically oxidized in sulfuric acid. Its total thickness is 0.3 mm, the oxide weight is 3.21 g/m$^2$ and the thickness of the oxide layer is about 1 μm. In the process according to the invention, the aftertreatment is carried out in an aqueous solution having a 1% concentration of the sheet sodium silicate, using demineralized water. This solution had a pH of 11.4. In the aftertreatment stage, the printing plate substrate was immersed in the immersion bath at a temperature of 60° C. The immersion times were from 10 s to 120 s. As is evident from FIG. 3, the aluminum oxide is only slightly attacked. The surfaces of the substrate which were treated for 10 s, 30 s and 120 s in the 1% strength sheet sodium silicate solution at 60° C. show scarcely any change compared with the starting material in scanning electron micrographs, only the porosity of the surface, i.e., the fineness of the pore structure, increasing slightly. In comparison, the surfaces of substrates in which sodium metasilicates $Na_2SiO_3.5H_2O$ were used under otherwise identical immersion conditions for silicate application were also investigated. These investigations were carried out for the immersion temperatures from 25° C. to 60° C. Very pronounced oxide degradation is found, which, even at a low immersion temperature of 25° C., is still substantially higher than in the case of silicate application with sheet sodium silicate. The 1% strength sodium metasilicate solution (10 g/l $Na_2SiO_3.5H_2O$, the water of crystallization not taken into account) has a pH of 12.2

The oxide degradation is determined gravimetrically in a chromium/phosphoric acid bath at a higher temperature of about 70° C. by differential weighing; the initial oxide weight of the substrate is 3.21 g/m$^2$ at an immersion temperature of 60° C.

The weight per unit area of aluminum oxide layers is determined by chemical removal according to DIN standard 30944 (March 1969 edition).

The alkali resistance measurements for substrates after a treatment with sheet sodium silicate and rinsing with water having different compositions are explained with reference to FIG. 4. In the experiments, aluminum substrates were immersed in a 1% strength sheet sodium silicate solution (10 g/l of sheet sodium silicate in demineralized water) at various immersion temperatures in the range from 40° to 80° C. for different times, the immersion times being 10 s, 30 s, and 120 s. After the solution had been squeezed off, the sample was treated in a rinsing step either with demineralized water or with municipal water at room temperature for about 20 s. The results of these experiments are shown in FIG. 4.

Further experiments starting from an aftertreated substrate. (1% strength sheet sodium silicate solution/demineralized water, immersion bath temperature 60° C., immersion time varies) were also carried out (cf. Table 1).

In addition to NaCl, mainly $Ca^{++}$ and $SO_4^{--}$ but relatively little Mg are detectable in municipal water.

Figure 4:
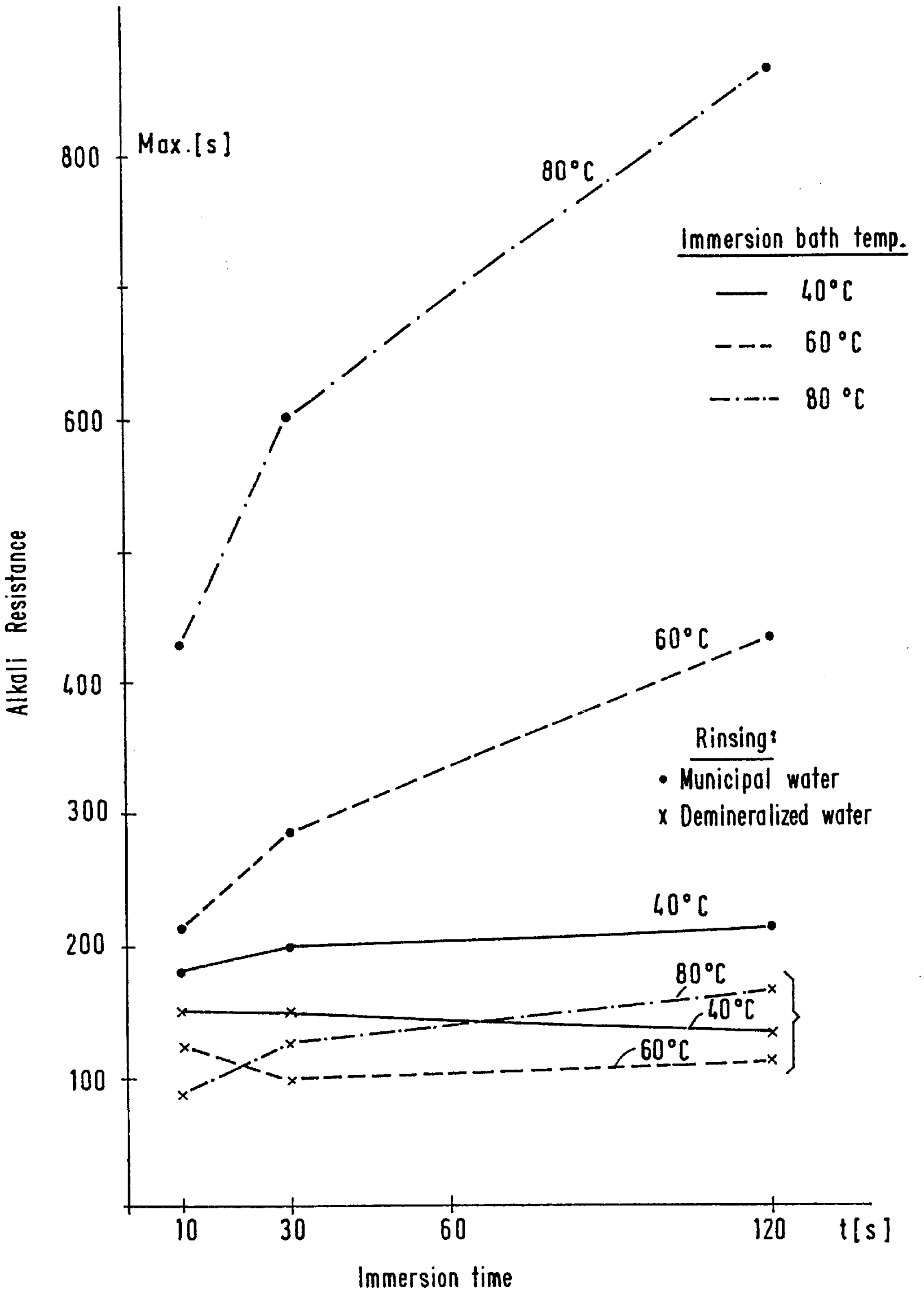
FIG. 4 shows the alkali resistance of aftertreated substrates as a function of the immersion time.

As shown in FIG. 4, rinsing with demineralized water results in at most a slightly increased alkali resistance which shows only slight dependence on the immersion temperature. The aftertreatment with municipal water results in an alkali resistance of the anodically oxidized aluminum surface which is substantially higher than in the case of the aftertreatment with demineralized water. This alkali resistance increases sharply with increasing immersion bath temperature of the sheet sodium silicate solution.

In these experiments (see Table 1), an aluminum substrate was also washed with a 1% strength sheet sodium silicate solution at 60° C. for two minutes and then rinsed with demineralized water for comparison. The mean value of the measured alkali resistance from six double measurements of sheets treated in this manner is 106±19 s up to attainment of the maximum. On the other hand, the alkali resistance of a standard silicate application in which rinsing is effected with municipal water is substantially increased. Simultaneously with the increase in the alkali resistance on rinsing with municipal water, the Na ions are for the most part exchanged for Ca ions.

TABLE 1

| ů-$Na_2Si_2O_5$ aftertreatment 1% sheet sodium silicate solution Immersion temp. 60° C. | | Alkali resistance | ESCA: X/Al (X = Si, Na, Ca) max. after s | | |
|---|---|---|---|---|---|
| Immersion time/s | Rinsing | (20 s) | Si | Na | Ca |
| 20 | Demin. $H_2O$ | 80/82 | 0.33 | 0.18 | — |
| 120 | Demin. $H_2O$ | 99/61 | 0.44 | 0.22 | — |
| 20 | Municipal water | 206/127/188 | 0.34 | 0.04 | 0.06 |
| 120 | Municipal water | 447/244/209 | 0.47 | 0.06 | 0.07 |
| 120 | Demin. $H_2O$ | 78 | 0.46 | 0.20 | — |
| 120 | Demin. $H_2O$ | 119 | 0.51 | 0.15 | — |
| 120 | Demin. $H_2O$ | 118 | 0.43 | 0.22 | — |
| 120 | Demin. $H_2O$ | 86 | 0.43 | 0.21 | — |
| 120 | Municipal water (60° C./20 s) | 307 | 0.43 | 0.03 | 0.06 |
| 10 | Demin. $H_2O$ | 100 | 0.27 | 0.14 | 0.02 |
| 30 | Demin. $H_2O$ | 95 | 0.36 | 0.18 | 0.01 |
| 120 | Demin. $H_2O$ | 150 | 0.43 | 0.16 | 0.02 |

TABLE 1-continued

| ů-$Na_2Si_2O_5$ aftertreatment 1% sheet sodium silicate solution Immersion temp. 60° C. | Alkali resistance | ESCA: X/Al (X = Si, Na, Ca) max. after s |
|---|---|---|

The municipal water used for rinsing has the following composition: pH = 7.7, 16° D.H. (German hardness), 10.5° $GXI_3$ carbonate hardness;

| | | | |
|---|---|---|---|
| Ca ions | 85 mg/l | Cl ions | 102 mg/l |
| Mg ions | 15 mg/l | $SO_4$ ions | 75 mg/l |
| Na ions | 61 mg/l | $NO_3$ ions | 6 mg/l |
| K ions | 5.8 mg/l | $SiO_2$ ions | 5.9 mg/l |
| | | DOC | 0.8 mgC/l |

where DOC=dissolved organically bonded carbon.

The detected substantially increased alkali resistance as a result of rinsing with municipal water is presumably due to the fact that, on treatment with sheet sodium silicate ů-$Na_2Si_2O_5$, aluminosilicates (Na salts) first form, which aluminosilicates form further alkali-resistant bonds, for example with Ca, K, Mg and possibly with the anions in the rinsing step with municipal water.

Investigations aimed at improving the surface properties, in particular increasing and stabilizing the alkali resistance, by selective rinsing of the substrates treated with sheet sodium silicate with various aqueous salt solutions as stage (b) were also carried out. Alkali resistance measurements were furthermore carried out on substrate sheets which had been pretreated in a standard manner and were rinsed with anion-containing salt solutions. The substrate sheets were provided with a silicate coat using 1% strength sheet sodium silicate solution, the immersion temperature being 60° C. and the immersion time 120 s, and were then washed with demineralized water, the water was squeezed off and the sheets were then rinsed in the salt solutions mentioned below, the immersion time being 20 s at room temperature. For the most part, from 0.1 to 0.4% strength salt solutions were used for rinsing, a 1% strength salt solution being used only in one case for comparison purposes.

Alkali resistance values were determined for the following rinsing solutions:

| Rinsing solutions: | Alkali resistance: |
|---|---|
| 0.4% strength $NaHCO_3$ in demineralized $H_2O$ | 210/204 s up to maximum |
| 1.0% strength $NaHCO_3$ in demineralized $H_2O$ | 350 s up to maximum |
| 0.4% strength $Na_2CO_3$ in demineralized $H_2O$ | 258 s up to maximum |
| 0.4% strength $Na_2SiO_3$ in demineralized $H_2O$ | 413 s up to maximum |
| 0.4% strength $Na_3PO_4$ in demineralized $H_2O$ | 278 s up to maximum |

In addition to the alkaline earth metal cations, anions too have a decisive effect on the magnitude of the alkali resistance, which can be substantially increased, for example, by $HCO_3^-$, $PO_4^{3-}$, $SiO_3^{2-}$ or $CO_3$2− anions, by rinsing with the appropriate salt solutions. The list also shows that the alkali resistance also increases on rinsing in an $NaHCO_3$ solution of increasing concentration.

Table 2 below shows alkali resistance values for further rinsing solutions, together with the ratios X/Al of different alkaline earth metals X in the rinsing solutions to aluminum Al, measured by the ESCA method.

For these measurements, the samples were prepared in the standard manner of the invention, i.e., by silicate application in demineralized water with the aid of 1% strength sheet sodium silicate solution, at an immersion temperature of 60° C. and for an immersion time of 120 s. Rinsing was carried out with demineralized water and with solutions in which 0.4% in each case of $CaCl_2$, $MgCl_2$, $SrCl_2$ and dextrin had been dissolved. Further solutions were $CaSO_4$, $Na_2SO_4$, $MgSO_4$, NaF, LCl and $NaHCO_3$ in a range from 0,1 to 10 % by weight, preferably 0,4%. After drying, the alkali resistance value and the X/Al ratios were determined by ESCA measurements in order to determine the surface coating with Si, Na, Ca, Sr and the like.

Figure 5:
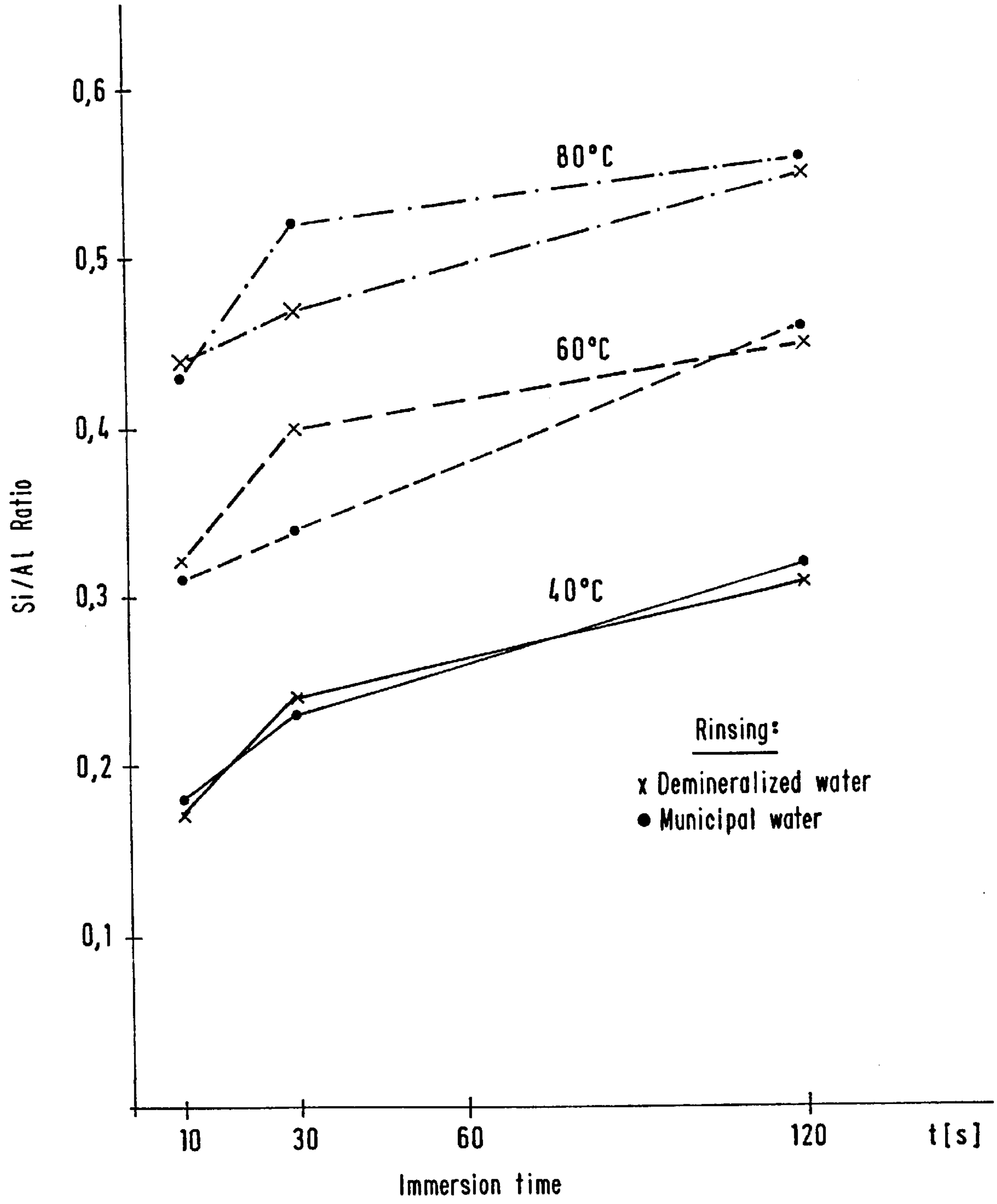
FIGS. 5 and 6 show the Si/Al ratio in the surface of aftertreated substrates and the Na and Ca content of the surface after rinsing with demineralized water and with municipal water.
Figure 6:
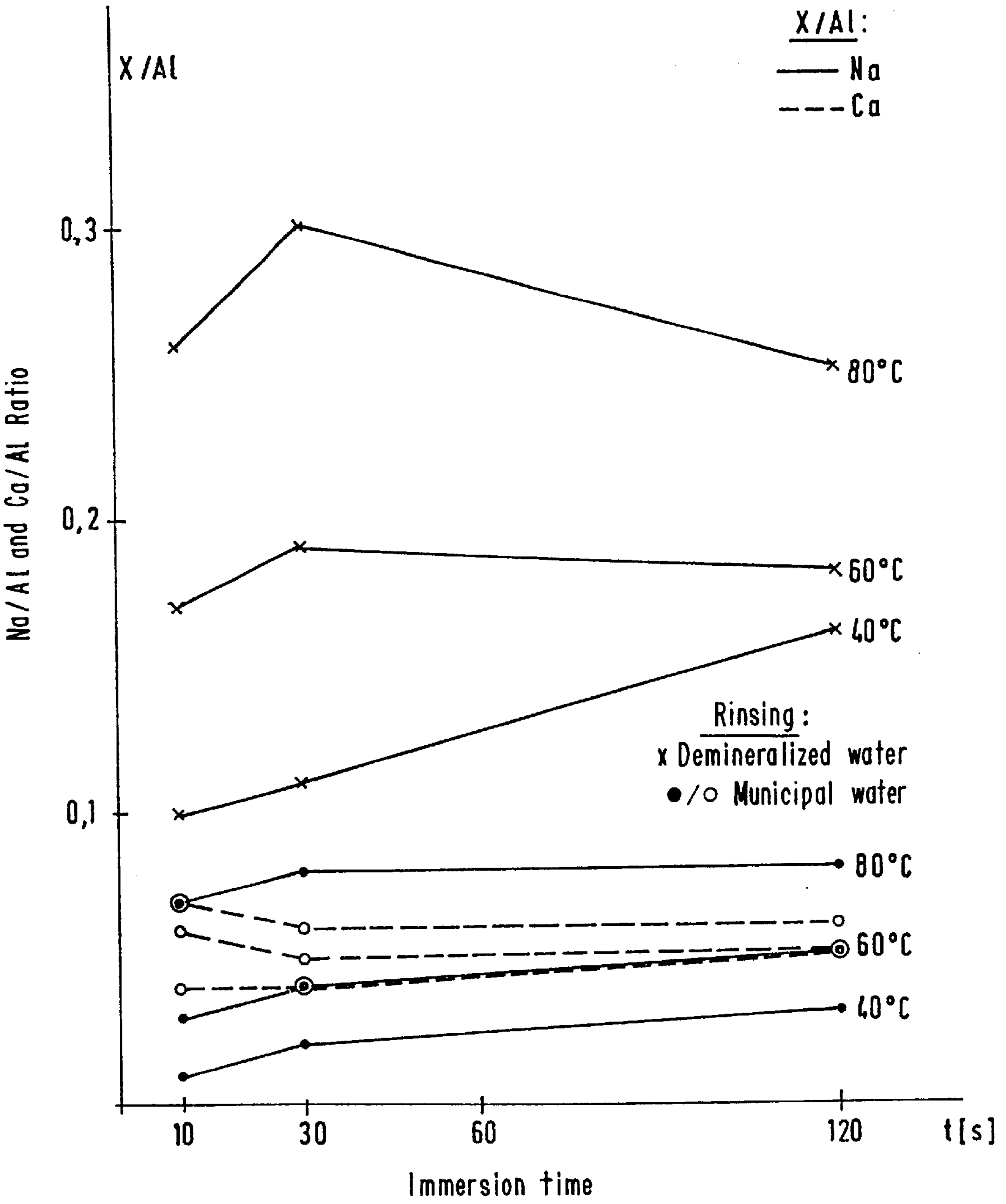

The results for the temperature dependence of the silicate application are shown in FIGS. 5 and 6:

According to FIG. 5, the Si/Al ratio is independent of the rinsing and increases sharply with increasing temperature and with increasing immersion time.

FIG. 6 shows that the Ca/Al and Na/Al ratios are in the same region of about 0.05±0.02 on washing with municipal water, whereas the Na/Al ratio increases with increasing temperature, similarly to the Si/Al ratio, on rinsing with demineralized water.

The sheet sodium silicate applied to the Al/AlOOH surface substantially retains its ion exchange function; the alkaline earth metal ions replace the Na ions in the silicate-containing Al/AlOOH surface.

TABLE 2

| Sheet sodium silicate | Rinsing | Alkali resistance in s up to the maximum | ESCA: X/Al X = Ca, Mg, Sr, F, P | | |
|---|---|---|---|---|---|
| | | | Si/Al | Na/Al | X/Al |
| Standard | Demineralized water | 80–120 | 0.46 | 0.20 | |
| " | 0.4% $CaCl/_2$DW | 145 | 0.47 | 0.02 | 0.07/Ca |
| " | 0.4% $MgCl_2$/DW | 118 | 0.48 | 0.04 | ?/Mg |
| " | 0.4% $SrCl_2$/DW | 126 | 0.49 | 0.02 | 0.07/Sr |
| " | Municipal water D.H. = 16° | 200–250 | 0.47 | 0.06 | 0.07/Ca |
| " | 0.4% dextrin/DW | 130 | 0.49 | 0.16 | — |
| Standard | 0.4% $CaCl_2$/ municipal water | 217 | 0.49 | 0.04 | 0.06/Ca |
| " | 0.4% $CaCl_2$/ 60° C. municipal water | 254 | 0.42 | 0.03 | 0.08/Ca |
| " | 0.1% $CaSO_4$/DW | 212/242 | 0.42 | 0.03 | 0.10/Ca 0.06/P |
| " | 0.4% $Na_2SO_4$/ DW | 90/115 | 0.46 | 0.29 | — |
| " | 0.2% $MgSO_4$/DW | 144 | 0.42 | 0.09 | 0.05/P |
| Standard | 0.4% NaF/DW | 182**/255 | 0.47 | 0.33 | 0.13/F |
| " | 0.4% NaF/* municipal water | 362 | 0.46 | 0.29 | 0.21/F 0.06/Ca |
| " | 0.4% NaF/ 60° C.* | 246 | 0.39 | 0.41 | 0.35/F 0.09/Ca |
| " | 0.4% NaF/60° C. | 128** | 0.40 | 0.43 | 0.19/F |
| Standard | 0.22% LC1/DW | 110/135 | 0.31 | 0.01 | 0.58/P |
| " | 0.4% $NaHCO_3$/ DW | 210/204 | 0.42 | 0.31 | — |
| " | 0.4% $NaHCO_3$/ 60° C. | 168** | 0.45 | 0.31 | — |

**2nd max./mean value acid
*Washed with municipal water before rinsing
LC1 = polyvinylphosphonic
DW = Demineralized water The results of the rinsing experiments in Table 2 and the diagrams in FIGS. 4 to 6 permit the following conclusions:

Under standard conditions for silicate application to the surfaces of the substrate sheets, a higher silicate occupancy is achieved by an increase in the sheet sodium silicate concentration and in the immersion temperature to 80° C. as well as by a possible prolongation of the immersion time and aging of the Al/AlOOH substrate surface.

The applied sheet sodium silicate having an Si/Al ratio of from 0.4 to 0.5 and an Na/Al ratio of about 0.2 does not increase the alkali resistance on rinsing with demineralized water.

On the substrate surface, the sheet sodium silicate retains its ion exchange properties, i.e., the Na ions are exchanged for Ca ions when rinsing is carried out with municipal water.

As a result of rinsing with municipal water in which various ions, in particular Ca and Mg, are present, the alkali resistance is substantially increased and the measured values are above 200 s. This effect is reinforced if the municipal water is heated, for example to 60° C. for about 20 s. The value of the alkali resistance is then about 300 s. According to FIG. 4, the alkali resistance value is more than 400 s at an immersion bath temperature of 60° C.

Rinsing with various salt solutions in demineralized water does not substantially increase the alkali resistance; the alkali resistance can be increased only using salt solutions based on, for example, $NaHCO_3$, $CaSO_4$ or $MgSO_4$.

Rinsing with 0.4% strength NaF solution in demineralized water or in municipal water results in very high alkali resistance. It is presumed that the hardly soluble $CaF_2$ is formed in the sheet silicate owing to a preceding rinse with municipal water and then considerably increases the alkali resistance.

The advantages of sheet sodium silicate over other silicates, such as, for example, $Na_2SiO_3$, are its lower alkalinity and the greatly reduced oxide attack, as has already been described with reference to FIG. 3.

The silicate layer is retained even after gumming is completed. In the ESCA measurements, gumming is detected by the indication of the presence of phosphorus, while the constant Si/Al ratio shows that the gumming does not adversely affect the silicate application.

To investigate the chemical fog formation, substrates of type P51 in format 32×27 cm, coated with sheet sodium silicate and rinsed with municipal water in a standard manner, were produced and were hand-coated with a positive printing plate formulation (P61 solution) and a negative printing plate formulation (N50 solution). For comparison purposes, an untreated substrate P51, which was also not treated with LCl solution, was furthermore coated with the same printing plate formulations and then dried.

The positive substrates P51 were developed for 60 s with a developer EP26 after exposure and were then sprayed on. The negative substrates N50, which were not exposed, were treated for 60 s manually with 30 ml of DN-5 developer and then sprayed on.

The essential components of the EP26 developer are sodium silicate, sodium hydroxide, sodium tetraborate, strontium levolinate, polyglycol and water. The DN-5 developer contains benzyl alcohol, mono-, di- and triethanolamine and nitrogen and has a pH of 10.9.

After visual evaluation, the blue chemical fog formation is more pronounced in the case of the positive substrates than is the green chemical fog formation in the case of the negative substrates, the fog formations being least detectable on those substrates in which the silicate coating was rinsed with municipal water.

The values shown in Table 3 below for the lightness L and the color shift a/b of the substrates are measured according to DIN standard 6171 (version of January 1979). The values entered in Table 3 are the mean values of three measurements.

TABLE 3

| P51 substrate/ after treatment | Plate type | Development time/developer | L | a | b |
|---|---|---|---|---|---|
| without LC1/untreated | uncoated | — | 77.7 | −0.26 | 0.65 |
| without LC1/untreated | +(P61) | 60 s/EP26 | 74.7 | −0.82 | −0.10 |
| without LC1/untreated | −(N50) | 60 s/DN-5 | 74.7 | −1.82 | 0.48 |
| SKS-6 standard/ municipal water | uncoated | — | 77.0 | 0.08 | 0.64 |
| SKS-6 standard/ municipal water | +(P61) | 60 s/EP26 | 74.1 | −0.64 | −1.39 |
| SKS-6 standard/ municipal water | −(N50) | 60 s/DN-5 | 75.7 | −0.96 | 0.06 |
| SKS-6 standard/ demineralized water | uncoated | — | 77.4 | 0.04 | 0.55 |
| SKS-6 standard/ demineralized water | +(P61) | 60 s/EP26 | 71.6 | −1.57 | −4.3 |
| SKS-6 standard/ demineralized water | −(N50) | 60 s/DN-5 | 73.9 | −1.92 | −1.62 |

SKS-6 = Sheet sodium silicate u-$Na_2Si_2O_5$

While several embodiments of the invention have been described, it will be understood that it is capable of further modifications, and this application is intended to cover any variations, uses, or adaptations of the invention, following in general the principles of the invention and including such departures from the present disclosure as to come within knowledge or customary practice in the art to which the invention pertains.

What is claimed is:

1. A substrate comprising an aluminum or aluminum alloy material having an aluminum oxide layer coated with an alkali metal silicate layer, wherein the alkali metal silicate layer comprises an anhydrous and crystalline alkali metal silicate, wherein the alkali metal silicate comprises a sheet sodium silicate having a polymeric wavy sheet structure of the silicate framework.

2. A substrate as claimed in claim 1, wherein the substrate comprises an aluminum or aluminum alloy sheet, foil, or strip, which has been chemically, mechanically or electrochemically roughened, and anodically oxidized thereby forming the aluminum oxide layer.

3. A substrate as claimed in claim 1, wherein the sodium silicate has the composition ν-$Na_2Si_2O_5$, and the $SiO_2$:$Na_2O$ molar ratio of the crystalline sheet sodium silicate is in the range from about 1.9:1 to about 3.5:1.

4. A substrate as claimed in claim 3, wherein, on the aluminum oxide layer to which the silicate layer is applied, the Si/Al ratio is from about 0.10 to about 0.8 and the Ca/Al ratio is from about 0.01 to about 0.15.

5. A substrate as claimed in claim 1, further comprising a radiation-sensitive coating on the alkali metal silicate layer.

6. A substrate as claimed in claim 1, wherein the alkali metal silicate has at least a portion of the alkali metal exchanged with other metal ions.

7. A material comprising a substrate having a treated aluminum oxide layer, wherein the treated aluminum oxide layer is produced by (a) treating the aluminum oxide layer with an aqueous solution of an anhydrous, pure crystalline alkali metal silicate, wherein the alkali metal silicate comprises a sheet sodium silicate having a polymeric wavy sheet structure of the silicate framework, and (b) rinsing the treated aluminum oxide layer with ion-containing water.

8. A material as claimed in claim 7, wherein the substrate comprises aluminum or an aluminum alloy, which has been chemically, mechanically or electrochemically roughened, and anodically oxidized thereby forming the aluminum oxide layer.

9. A material as claimed in claim 7, wherein the substrate comprises aluminum or an aluminum alloy in the form of a sheet, foil, or strip.

10. A material as claimed in claim 7, wherein the ion-containing water comprises alkali metal ions or alkaline earth metal ions.

11. A material as claimed in claim 7, wherein the alkali metal silicate comprises the delta modification of sheet sodium silicate $Na_2Si_2O_5$.

12. A material as claimed in claim 11, wherein a $SiO_2$/$Na_2O$ molar ratio of the sheet sodium silicate is in the range from about 1.9:1 to about 3.5:1.

13. A material as claimed in claim 7, wherein the ion-containing water comprises mains or municipal water.

14. A material as claimed in claim 7, wherein the ion-containing water comprises an aqueous salt solution.

15. A substrate as claimed in claim 7, further comprising a radiation-sensitive coating on the alkali metal silicate layer.

* * * * *